United States Patent [19]
Maeda

[11] Patent Number: 4,785,901
[45] Date of Patent: Nov. 22, 1988

[54] RACK AND PINION STEERING GEAR WITH ELECTRIC POWER ASSISTANCE

[75] Inventor: Naoyuki Maeda, Aichi, Japan

[73] Assignee: Tokai TRW & Co. Ltd., Aichi, Japan

[21] Appl. No.: 71,094

[22] Filed: Jul. 8, 1987

[30] Foreign Application Priority Data

Jul. 17, 1986 [JP] Japan .................. 61-109996[U]

[51] Int. Cl.[4] .............................................. B62D 5/04
[52] U.S. Cl. .................................. 180/142; 180/79.1; 180/148
[58] Field of Search ............. 180/147, 148, 141, 142, 180/79.1, 132; 74/388 PS; 318/2, 689, 587, 671

[56] References Cited

U.S. PATENT DOCUMENTS

| | | | |
|---|---|---|---|
| 4,558,759 | 12/1985 | Baatrup | 180/132 |
| 4,593,780 | 6/1986 | Saito | 180/79.1 |

FOREIGN PATENT DOCUMENTS

| | | | |
|---|---|---|---|
| 90697 | 10/1983 | European Pat. Off. | 180/148 |
| 2056066 | 5/1972 | Fed. Rep. of Germany | 180/141 |
| 167868 | 10/1982 | Japan | 180/142 |
| 2170763 | 2/1986 | United Kingdom . | |

Primary Examiner—John J. Love
Assistant Examiner—Everett G. Diederiks, Jr.
Attorney, Agent, or Firm—Tarolli, Sundheim & Covell

[57] ABSTRACT

A rack-pinion type electrically powered steering apparatus is provided with an electronic control circuit adapted to control a motor driving current which is applied to a motor for power assistance, in response to a steering load characteristic and/or a vehicle speed characteristic. The steering apparatus is also provided with a rack end proximity sensor adapted to detect a position adjacent the both ends of the rack during a steering operation, and a device for providing the motor driving current with an attenuation characteristic in response to the detected signal from said rack end proximity sensor.

2 Claims, 3 Drawing Sheets

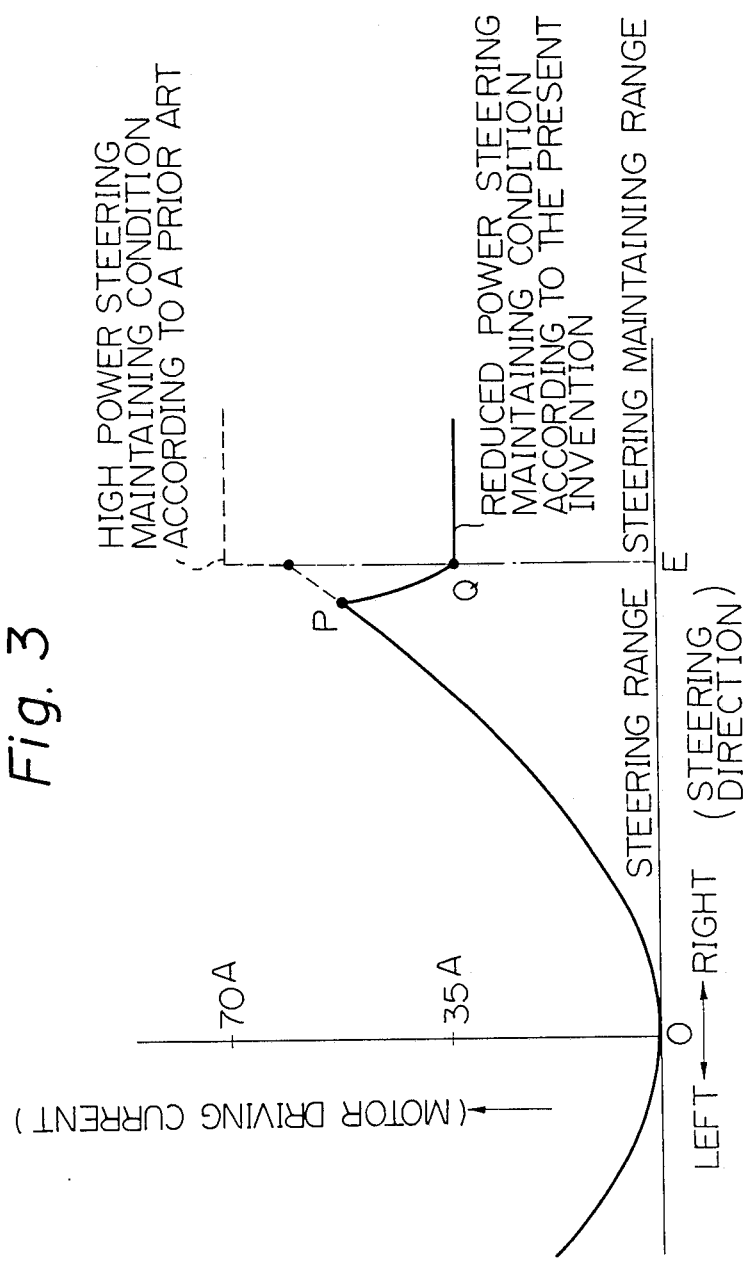

RACK AND PINION STEERING GEAR WITH ELECTRIC POWER ASSISTANCE

BACKGROUND OF THE INVENTION

1. Field of the Invention

The present invention relates to a rack-pinion type electrically powered steering apparatus and more particularly to an electrically powered steering apparatus provided with a device adapted to attenuate the driving current to the motor for power assistance in the vicinity of both ends of the rack when a steering wheel is operated.

2. Prior Art

An electrically powered steering apparatus of prior art is normally provided with a torque sensor adapted to respond to the steering load and a speed sensor adapted to respond to the speed of a vehicle. The electrically powered steering apparatus is further provided with an electronic control circuit for driving a motor for power assistance, which is adapted to input the detected signals from the torque sensor and the speed sensor and to output a pulse signal which has been pulse-width-modulated and amplified, the pulse signal having a steering load response characteristic and a speed response characteristic, so that when a steering wheel is operated the power assisting amount of time can be properly established.

In the conventional electrically powered steering apparatus as explained above, the driving current, which is applied from a battery installed in the vehicle, to the motor for power assistance under the control of the electronic control circuit is kept at an extremely small value when the vehicle is moving at a relatively high speed with little steering load, but is increased to a fairly large value when the vehicle is moving at a low speed or is at a stop. Consequently there have been certain problems in that, when the steering condition is continuously maintained at a location near the both ends of the rack in a steering mechanism, the power consumption caused by the electronic control circuit and the motor may increase to an extent that results in overdischarging of the battery installed in the vehicle and may also cause the windings of the motor to be overheated.

SUMMARY OF THE INVENTION

The present invention has been proposed to eliminate such problems as mentioned above. It is an object of the present invention, therefore, to provide an electrically powered steering apparatus provided with a device for gradually attenuating a driving current applied to a motor for power assistance within a range in which power assistance may be maintained at the time of a high steering load and in a condition near opposite ends of the rack when steering is continuously maintained.

Another object of the present invention is to provide a rack-pinion type electrically powered steering apparatus provided with an electronic control circuit adapted to control a motor driving current which is applied to a motor for power assistance in response to a steering load characteristic and/or a vehicle speed characteristic, characterized by the provision of a rack-end proximity sensor adapted to detect a position adjacent the both ends of the rack during a steering operation, and a device for providing the motor driving current with an attenuation characteristic in response to the detected signal from the rack end proximity sensor.

According to the present invention, when the position adjacent the rack end is detected by the rack end proximity sensor at the time of steering when the vehicle is running at an extremely slow speed or is at a stop, the attenuation device including the time constant circuit is caused to furnish the time-delayed attenuating characteristic to the electronic control circuit adapted to control the motor driving current whereby the steering maintenance current near the rack ends can be maintained at a relatively low level within a optimumly low level range.

According to the present invention, since the motor driving current can be attenuated so that the steering maintenance current is maintained at a relatively low level within a optimumly low range near the rack ends when the steering wheel is operated and the vehicle is moving at an extremely slow speed or is at a stop, the rated current values for the power unit of the electronic control circuit and the motor can be set at a relatively low level so as to allow for an economical level of power consumption and effectively prevent abnormal heat generation of the motor or over-discharge of the battery installed in the vehicle, which problems have occurred in the prior arts.

Further, according to the present invention since the motor driving current can be gradually attenuated with the time-delayed characteristic near the rack ends, transition into the current attenuation control can be smoothly carried out, so that any likelihood of shock being imparted to a driver can be substantially avoided.

BRIEF DESCRIPTION OF THE DRAWINGS

FIG. 3 shows a characteristic curve of the operation attained by the present invention.

PREFERRED EMBODIMENT OF THE INVENTION

Figure 1:
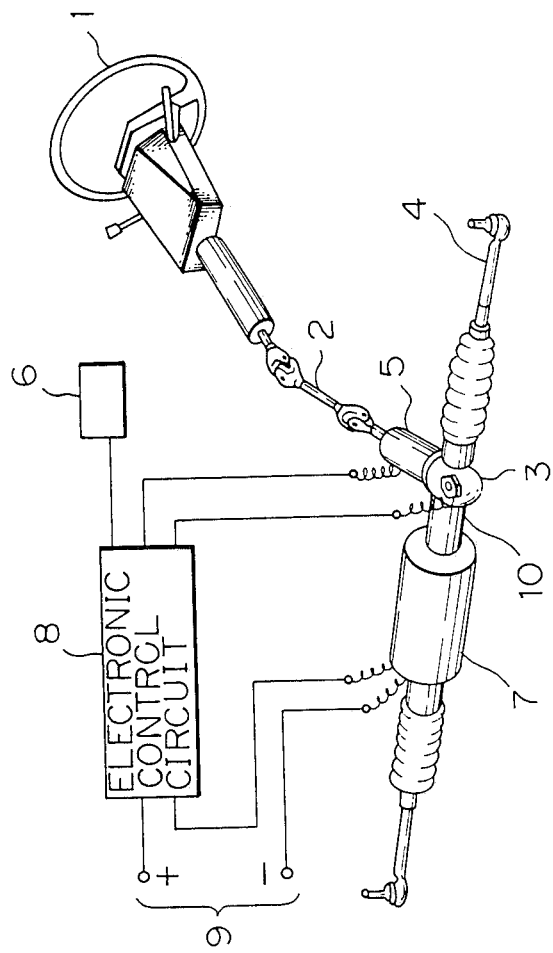
FIG. 1 is a schematic illustration of an electrically powered steering apparatus provided with a device adapted to attenuate the driving current to the motor for power assistance according to the present invention.

FIG. 1 schematically shows an electrically powered steering apparatus provided with a device for attenuating the driving current to be applied to the motor for power assistance according to the present invention.

A steering wheel 1 is coupled with a pinion gear provided in a gear housing 3 through a column shaft 2. Rotation of the steering wheel 1 is transmitted to a tie rod 4 through a rack gear in meshing engagement with the pinion gear. On the other hand, a steering load signal generated by the torque sensor 5 in response to the steering load and a vehicle speed signal generated by the speed sensor in response to vehicle speed are applied to an electronic control circuit 8 adapted to control the driving current that is to be applied to a motor 7 for power assistance.

The basic constitution of the electronic control circuit 8 is well known by those skilled in the art. The circuit is so constructed that the frequency signal output from the speed sensor 6 is, for example, applied to a frequency-voltage converter and the converted voltage signal output from the converter is compared by a comparator with a reference signal from a reference oscillator, while an analog signal from the torque sensor 5 is also applied to the comparator through a pulse shaper and is combined in the comparator with the signal provided by the speed sensor, and the pulse-width modulated and amplified pulse signal having the steering load response characteristic and the vehicle speed response characteristic is thereby output. Terminals 9 designate power terminals of the battery installed in a vehicle.

An output signal or a motor driving signal from the electronic control circuit 8 is then applied to a motor 7. Rotation of the motor provides an axial thrust to the rack gear for steering through an appropriate transmission mechanism whereby power assistance can be effected.

According to the present invention, as shown in FIG. 1, the gear housing 3 is further provided with a rack end proximity sensor 10 adapted to detect the position adjacent the both ends of the rack gear. The detected signal is applied to the electronic control circuit 8.

Figure 2:
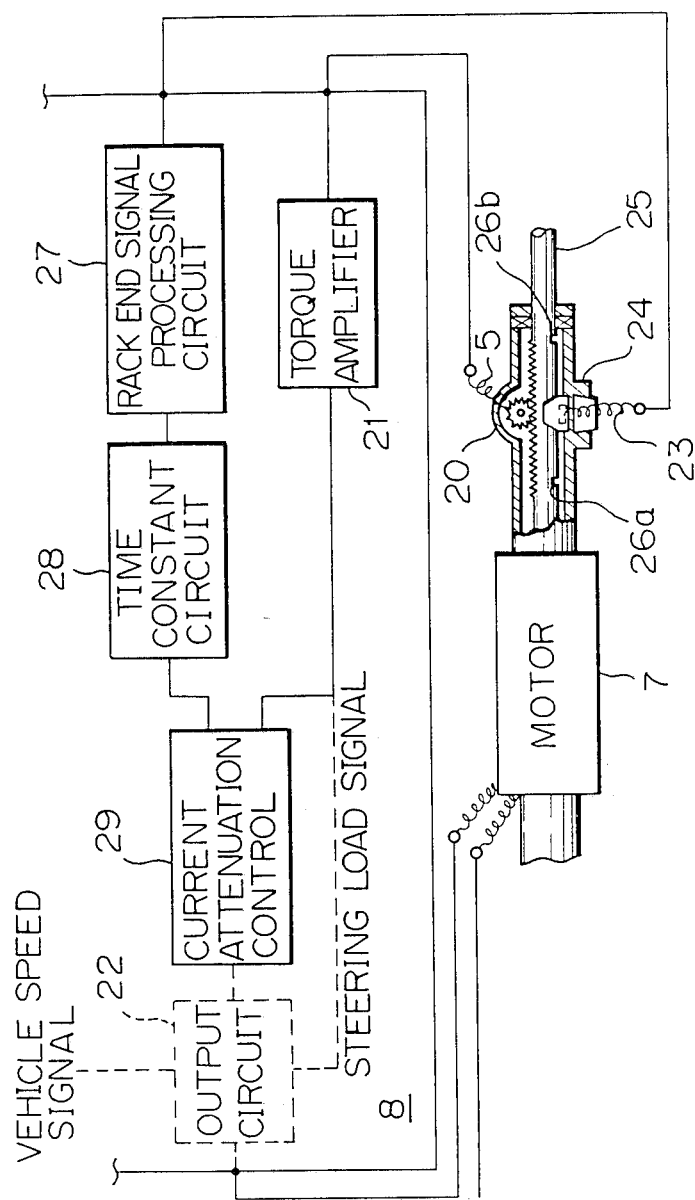
FIG. 2 is a block circuit diagram showing an embodiment of the attenuation device part shown in FIG. 1.

FIG. 2 shows a block circuit diagram relating to a motor current attenuation device which may be incorporated in the electronic control circuit 8 shown in FIG. 1 and also a schematic constitutional diagram of the torque sensor and the rack end proximity sensor which are provided in the gear housing.

In the electronic control circuit 8, the output signal from the torque sensor 5 which is responsive to the rotation of the pinion gear 20 that is connected to the steering wheel 1 through the column shaft 2 is applied to an output circuit 22 for the motor driving current, which includes a PWM (Pulse Width Modulation) circuit, through the torque amplifier 21( while the vehicle speed signal from the speed sensor 6 is also applied to the output circuit 22. Thus the electronic control circuit 8 can apply to the motor 7 the motor driving current with the steering load response characteristic and the vehicle speed response characteristic added thereto, as explained above.

A rack end proximity sensor 10 is comprised of a combination of a relatively small electromagnetic coil or a permanent magnet capable of detecting a magnetic member and a switch element (e.g., a combination of a Hall IC and a load relay), and is embedded in a support yoke 24 which presses against the rack bar. Concave dock portions 26a, 26b are provided on the rack bar 25 and are attracted opposite to the sensor 10 or more specifically at the locations on the rack bar 25 immediately before and adjacent the opposite ends of the leftward and rightward stroke of the gear portion thereof. Thus, when the steering wheel is operated, electrical detection signals can be provided at the locations near the left and right ends of the rack or the positions at which the dock portions face the sensor 10.

The detection signal from the rack end proximity sensor 10 activates a rack end signal processing circuit 27 such as a Schmit gate circuit and thereby causes the output signal therefrom to start the operation of a time constant circuit 28.

A current attenuation control circuit 29 is connected to the output of the time constant circuit 28 and the output of the torque amplifier 21. When the torque amplifier 21 outputs a steering load signal, namely when the steering wheel is operated, the control circuit 29 applies a current attenuation control signal to the output circuit 22, depending on a delay signal output from the time constant circuit, whereby current attenuation characteristics allowing the motor driving current to be time-delayed or gradually attenuated can be provided.

FIG. 3 illustrates the operational characteristic curve in respect of the present invention or the characteristic curve of the motor driving current in relation to the direction of steering.

As illustrated, when for example steering is effected in the right hand direction in a prior art apparatus, the motor driving current is increased to such an extent that the pinion in the steering mechanism is caused to reach the end E of the rack where, if the steering maintenance condition is further continued, a relatively high power steering condition may be maintained which causes the battery installed in the vehicle to be subjected to an overdischarge condition (see a dotted line in the graph).

In contrast, according to the present invention, if a position adjacent the end of the rack-gear or a position that is, for example, near the right end of the rack-gear is detected at the point P during steering by the rack end proximity sensor 10, the detection signal activates the rack end signal processing circuit 27 and then the time constant circuit 28 in the electronic control circuit 8 as explained above. As a result, the current attenuation control circuit 29 attenuates gradually the motor driving current (see the curve PQ in FIG. 3).

The level of the current attenuation control signal output from the current attenuation control circuit 29 is predetermined to assume a level that will not lead to loss of the power assistance capability in the steering maintenance condition. Accordingly, the motor driving current which has been time-delayed or gradually attenuated is subsequently held at a relatively low predetermined level of the current value (namely a reduced power steering condition).

What is claimed is:

1. A rack and pinion steering gear with electric power assistance comprising an electronic control circuit adapted to control a motor driving current which is applied to a motor for power assistance in response to a steering load characteristic and/or a vehicle speed characteristic, characterized by provision of a rack end proximity sensor adapted to detect a position adjacent both ends of the rack during a steering operation, and means for providing said motor driving current with an attenuation characteristic in response to a detected signal from said rack end proximity sensor, said means for providing an attenuation characteristic comprising a rack end signal processing circuit, a time constant circuit, and a current attenuation control circuit adapted to attenuate said motor driving current to a predetermined level, said time constant circuit providing when the detected signal from said rack end proximity sensor activates said rack end processing circuit a time-delayed characteristic to the motor driving current which is attenuated by said current attenuation control circuit.

2. In a rack and pinion steering gear having an electric motor for power assistance:
   a rack end proximity sensor to detect respective end portions of the rack when the rack approaches an end of its movement during a steering operation; and
   an electronic control circuit for controlling a motor driving current which is applied to the motor for effecting power assistance in response to a steering load characteristic and/or a vehicle speed characteristic, said electronic control circuit comprising:
   a current attenuation control circuit for attenuating the motor driving current to a predetermined level when the rack approaches an end of its movement during a steering operation;

a rack end signal processing circuit activated in response to said proximity end sensor detecting a respective end portion of the rack; and a time constant circuit for applying a control signal to said current attenuation control circuit in response to said rack end signal processing circuit being activated to cause said current attenuation to occur over a predetermined amount of time.

* * * * *